United States Patent [19]
LeCour

[11] Patent Number: 5,160,037
[45] Date of Patent: Nov. 3, 1992

[54] FILTER ASSEMBLY HAVING BY-PASS SYSTEM

[76] Inventor: Edward M. LeCour, Box 144, Shannock, R.I. 02875

[21] Appl. No.: 666,198

[22] Filed: Mar. 7, 1991

[51] Int. Cl.$^5$ ............................................. B01D 35/143
[52] U.S. Cl. ..................................... 210/90; 210/132; 210/340; 210/435
[58] Field of Search ................. 210/90, 132, 322, 435, 210/453, 130, 335, 340

[56] References Cited

U.S. PATENT DOCUMENTS

| | | | |
|---|---|---|---|
| 2,729,339 | 1/1956 | McCoy | 210/90 |
| 3,262,565 | 7/1966 | Silverwater | 210/90 |
| 3,268,077 | 8/1966 | Ball | 210/132 |
| 3,283,902 | 11/1966 | Farris et al. | 210/90 |
| 4,038,189 | 7/1977 | Dison et al. | 210/90 |
| 4,885,082 | 12/1989 | Cantoni | 210/90 |

FOREIGN PATENT DOCUMENTS 1237093  6/1971  United Kingdom ............... 210/130

Primary Examiner—Robert A. Dawson
Assistant Examiner—Matthew O. Savage
Attorney, Agent, or Firm—Salter, Michaelson & Benson

[57] ABSTRACT

A filter assembly for filtering a fluid medium having a housing in which a primary filter is located, the primary filter being disposed in an inlet chamber and receiving fluid medium to be filtered therefrom and directing the filtered fluid medium into an outlet chamber located in the housing for discharge therefrom. A secondary filter is located in the housing and is provided with a by-pass valve that is responsive to an increase pressure in the inlet chamber as a result of obstruction of the primary filter, the fluid medium being directed through the by-pass valve and into the secondary filter for entry thereafter into the outlet chamber for discharge from the housing. A by-pass filter is also provided and filters coarse particles from the fluid medium prior to passing through the by-pass valve and into the secondary filter.

5 Claims, 2 Drawing Sheets

FILTER ASSEMBLY HAVING BY-PASS SYSTEM

BACKGROUND OF THE INVENTION

The present invention relates to a filter assembly having a primary and secondary filter incorporated therein that provides for continuous fluid flow through the filter assembly, even though the primary filter may have become obstructed by contaminants removed from the fluid medium.

It has been recognized that it is necessary in many instances to provide for a continuous flow of a fluid that passes through a filtering device, even after the filtering device has become clogged through extensive use thereof. Examples of such use of fluid filter devices in the prior known filtering systems are illustrated in the U.S. Pat. No. 3,262,565 to Silverwater; U.S. Pat. No. 3,283,902 to Farris et al; U.S. Pat. No. 4,038,189 to Dison et al; and U.S. Pat. No. 4,885,082 to Cantoni. All of the prior filter devices as illustrated in the aforesaid patents include dual filter systems that were designed to permit flow of the fluid medium to be filtered to continue even though the primary filter may have become obstructed in the use thereof. These prior known systems, particularly as illustrated in the Silverwater and Farris et al Patents, included concentrically located filters that were disposed in a cylindrical housing, and also included a relief valve construction that was responsive to back pressure caused by obstruction of the primary filter. However, the prior systems were somewhat complex and unreliable in use. Further, these prior known devices included a number of elements that had to be precisely interfitted which rendered the filter assemblies uneconomical in use.

Other systems as represented by the prior art of which applicant is aware but that are of only general interest, are shown in the U.S. Pat. No. 2,879,892 to Frakes; U.S. Pat. No. 3,591,002 to Rosaen; U.S. Pat. No. 3,950,248 Brown et al; and U.S. Pat. No. 4,423,751 Roettgen.

As will be described hereinafter, the subject invention includes a relatively simple dual filter system that not only provides for the efficient filtering of the fluid medium as required, but that insures continuous flow of the fluid through a by-pass filter system when the primary filter becomes obstructed. The subject invention also includes a simple alarm device that audibly and visually indicates when the primary filter system has become obstructed.

SUMMARY OF THE INVENTION

The present invention includes a filter assembly for filtering a fluid medium as received from a source for recirculation thereof, and includes a housing having an inlet chamber that communicates with a fluid inlet means. A removable primary filter is located in the inlet chamber and receives a fluid medium for the filtering of unwanted deposits therefrom. An outlet chamber is also located in the housing and communicates with the primary filter for receiving the filtered fluid medium therefrom, outlet means communicating with the outlet chamber for directing the filtered fluid medium exteriorly of the housing for recirculation through the source of the fluid medium. A secondary filter is located in the outlet chamber in offset relation with respect to the primary filter and includes a by-pass valve which is protected from coarse particles by a by-pass filter that communicates with the inlet chamber. The by-pass valve is exposed to the pressure in the inlet chamber and is responsive to a predetermined increase of pressure in the inlet chamber as a result of back pressure created therein upon obstruction of the fluid path through the primary filter whereby the by-pass valve is moved to an open position. Thus, the fluid medium to be filtered passes through the by-pass filter and is directed into the secondary filter for the filtering thereof, the filtered fluid medium being discharged from the secondary filter into the outlet chamber for the removal thereof through the outlet means for recirculation to the source.

Accordingly, it is an object of the present invention to provide a fluid filtering system that includes a simple but effective means by which a fluid medium to be filtered is conveniently directed through a by-pass filter and a secondary filter for discharge through the system when the primary filter becomes obstructed through use, an alarm system also being included in the system to indicate that the primary filter has become obstructed.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DETAILED DESCRIPTION OF THE PREFERRED EMBODIMENTS

Figure 1:
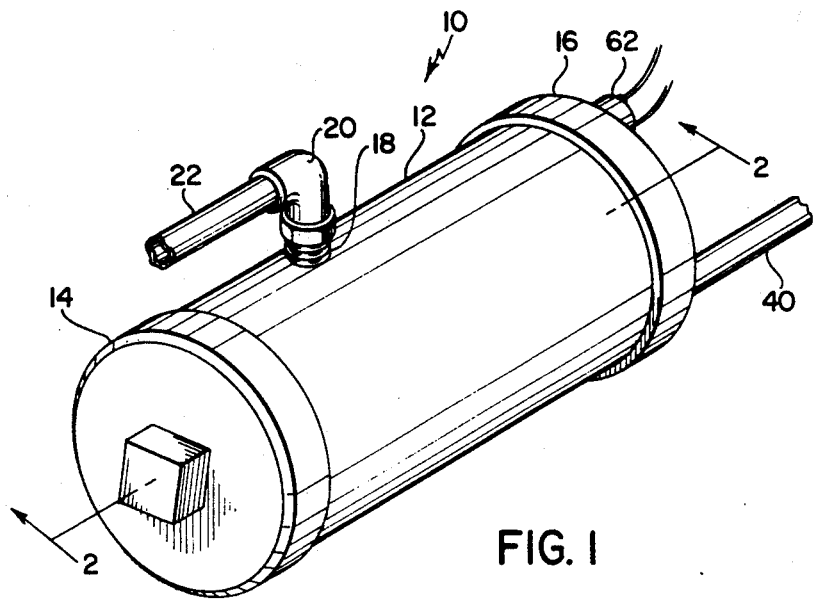
FIG. 1 is a perspective view of the housing of the filter assembly of the subject invention and illustrates a fluid inlet and discharge means that communicates with the housing.
Figure 2:
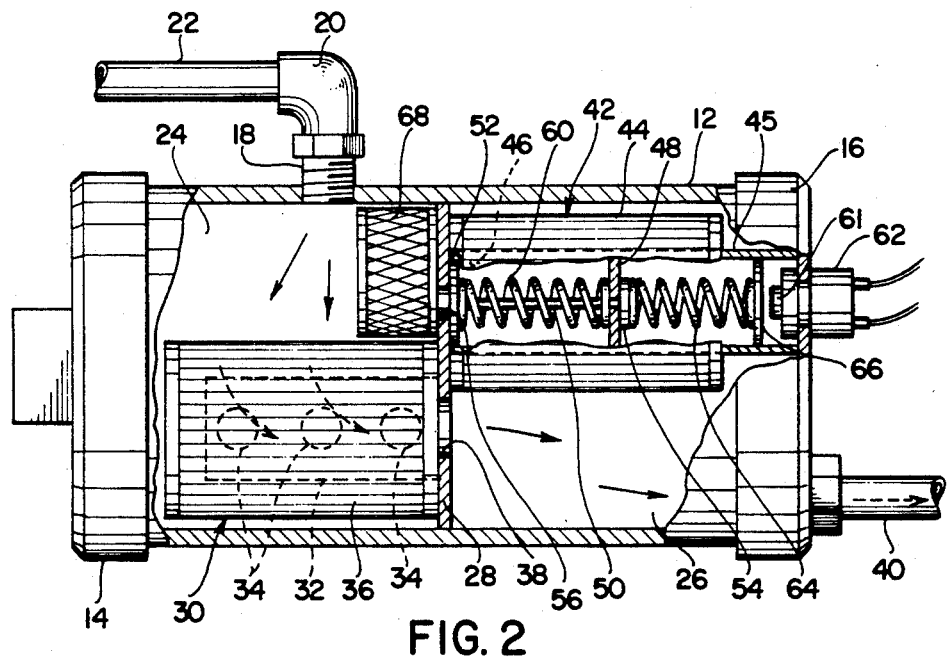
FIG. 2 is a sectional view taken along 2—2 in FIG. 1 and illustrates the primary and secondary filters that are located in the housing of the filter assembly.

Referring now to the drawings and particularly to FIGS. 1 and 2, the filter assembly embodied in the subject invention is illustrated and is generally indicated at 10. The filter assembly 10 is designed to be used with equipment that requires a filtering of a fluid such as fuel or oil, and in this connection has various applications; although one of the primary objectives of the invention is to provide a filter assembly for filtering a hydraulic fluid or oil that is used in connection with an internal combustion engine.

As shown in FIGS. 1 and 2, the filter assembly 10 includes a housing 12 that is cylindrical in configuration and includes a front-end cap 14 and a rear-end cap 16. The front-end cap 14 is intended for removal from engagement with the housing 12 and for this purpose may be internally threaded for engagement with external threads as formed on the adjacent end of the housing 12. As will be described, the removal of the end cap 14 provides for entry into the interior of the housing 12 for removal of filter elements located therein. Also fixed to the housing 12 is a threaded fitting 18 to which an elbow 20 is secured, an inlet conduit 22 being interconnected to the elbow 20. The inlet conduit 22 communicates with a source of fluid and directs the fluid interiorly of the housing 12 for the filtering of contaminants therefrom. As more specifically illustrated in FIG. 2, the interior of the housing 12 is divided into an inlet chamber 24 and an outlet chamber 26, an intermediate wall 28 being removably secured to the interior surfaces of the housing 12 in any convenient manner and separating the inlet chamber 24 from the outlet chamber 26.

Located in the inlet chamber 24 is a primary filter generally indicated at 30 that includes an interior filter element 32 that is formed of a suitable rigid plastic material, the interior filter element having a plurality of openings formed therein. The primary filter 30 also includes an exterior filter element 36 that is formed of any suitable wire mesh or cellulose paper or other filter material that is commonly used in fluid filter systems, the filter materials being normally constructed in a corrugated configuration. The interior element 32 of the primary filter 30 is secured to the intermediate wall 28 in any convenient manner and provides a base on which the exterior element 36 is mounted in place as illustrated in FIG. 2. As also illustrated in FIG. 2, a port 38 is formed in the intermediate wall 28 in adjacent relation to the interior filter element 32 and provides communication between the interior element 32, the primary filter 30, and the outlet chamber 26. Thus, fluid entering the primary filter 30 passes through the wire mesh material of the exterior element 36 and then into the interior element 32, through the interior filter openings 34 for discharge through the port 38 in the intermediate wall 28 and then into the outlet chamber 26. Joined to the end cap 16 of the housing 12 and communicating with the interior of the outlet chamber 26 is an outlet conduit 40 that returns the filtered fluid to the source thereof for recirculation.

On occasion, the filter element 36 of the primary filter 30 may become obstructed as a result of the filtration of contaminants from the fluid passing therethrough. Because the performance of the engine in which the filter assembly 10 is mounted can be affected by the malfunction of the filter assembly, it is essential to maintain continuous flow of the fluid through the filter assembly. It is understood that if the obstruction of the primary filter 30 is sufficient to prevent flow of the fluid therethrough, a complete breakdown of the engine in which the filter assembly is mounted can occur.

In order to provide for continuous flow of the fluid through the filter assembly, a secondary filter is provided as illustrated in FIG. 2 and is generally indicated at 42. The secondary filter 42 which is located in the outlet chamber 26 includes a cylindrical filter element 44 that is also designed to filter deposits or contaminants from fluid passing therethrough and may be formed of any suitable material such as wire mesh or cellulose paper, the materials also being constructed in a corrugated configuration, as is well known in filter constructions. The filter element 44 is mounted in place within the outlet chamber 26 by securement of an elongated interior tubular member 45 to the end cap 16. The elongated interior tubular member 45 that is formed with suitable openings therein, receives the filter element 44 of the secondary filter 42 thereon and has an internal passage 46 formed therein in which a plate 48 is fixed intermediate thereof. An opening is formed in the plate 48 through which a valve stem 50 of a by-pass valve extends, the valve stem 50 having a valve head portion 52 mounted thereon. Fixed to the opposite end of the valve stem 50 that slidably extends through an opening in the fixed plate 48 is a disc 54, the purpose of which will be described hereinafter. In order to provide access for the fluid from the inlet chamber 24 into the secondary filter 42, a port 56 is formed in the interior wall 28. In order to retain the valve head portion 52 of the by-pass valve in the closed position against the port 56, a compression spring 60 is provided and is located in encircling relation with respect to the valve stem 50, the compression spring 60 engaging the valve head portion 52 of the by-pass valve at one end and the fixed plate 48 at the other end. The spring 60 is calibrated for being compressed in accordance with a predetermined back pressure that is created in the inlet chamber 24 as a result of the obstruction of the primary filter 30. Thus, when flow of the fluid through the primary filter 30 is restricted due to the obstruction in the filter element 36, a back pressure is created in the inlet chamber 24, and when a predetermined pressure is reached the spring 60 will compress to cause the valve head portion 52 of the by-pass valve to move away from the port 56 to enable fluid to enter into the interior passage opening 46 of the secondary filter 42. Thereafter, the fluid is directed through the filter element 44 for passage into the outlet chamber 26, and is thereafter directed to the source through the outlet conduit 40.

In operation of the filter assembly 10 it is desirable to detect the malfunction of the primary filter, since the primary filter as constructed is intended to remove unwanted contaminants from the fluid in a more efficient manner than the secondary filter 42. Thus, when the primary filter 30 becomes sufficiently obstructed to cause flow of the fluid to enter into the secondary filter 42 through the by-pass valve, an alarm device is provided to indicate the by-pass condition of the filter assembly. The alarm device as illustrated in FIG. 2 includes a switch element 61 that is mounted interiorly in the end cap 16 and is interconnected to a sealed switch member 62 that extends into the passage 46 of the interior member 45, the switch member 62 being electrically connected to an audible and/or a visual alarm, that indicate the presence of increased pressure in the inlet chamber 24 and the malfunction of the primary filter 30. In order to actuate the switch member 62, a secondary spring 64 is provided that is designed to be weaker in compressive strength than the spring 60. An end of the spring 64 engages the disc 54 that is attached to the stem 50 of the by-pass valve, the opposite end of the spring 64 being interconnected to a plate 66. It is seen that upon movement of the by-pass valve in response to a back pressure as created in the inlet chamber 24, the valve stem 50 to which the disc 54 is secured compresses the spring 64 to cause the plate 66 to contact the switch element 61 that closes the switch 62, thereby causing the audible and/or the visual alarm to be actuated.

Since the filter element 44 of the secondary filter 42 can only effectively filter the fluid that passes therethrough, it is also desirable to prefilter coarse particles from the fluid prior to the entry thereof through the by-pass valve and into the secondary filter 42. For the purpose of protecting the by-pass valve from sediment build-up and for further pre-filtering the by-passed fluid prior to entry into the secondary filter 44 a wire by-pass filter 68 is provided and is secured internally of the housing 12 to the wall 28 as located therein. The wire by-pass filter 68 is located directly adjacent to the port 56 and is designed to prevent the coarse contaminants from depositing on the by-pass valve and entering into the secondary filter 42.

In operation of the filter assembly 10 as shown in FIGS. 1 and 2, fluid enters the inlet chamber 24 through the inlet conduit 22 and passes through the primary filter 30, and into the outlet chamber 26 by way of the port 38. The filtered fluid is then discharged from the housing 12 through the outlet conduit 40. If, for any reason the primary filter 30 becomes obstructed, usually as a result of clogging of the filter material by contaminants removed from the fluid, a back pressure is created in the inlet chamber 24 that results in the by-pass valve being moved to an open position to cause the fluid to pass through the by-pass filter 68, port 56 and into the interior passage 46 of the secondary filter 42. The fluid then flows through the filter element 44 into the outlet chamber and is discharged through the outlet conduit 40. Upon movement of the valve stem 50 in response to the opening of the by-pass valve, the switch 62 is closed to energize the audible and/or visual alarm to detect the malfunction of the primary filter 30.

Figure 3:
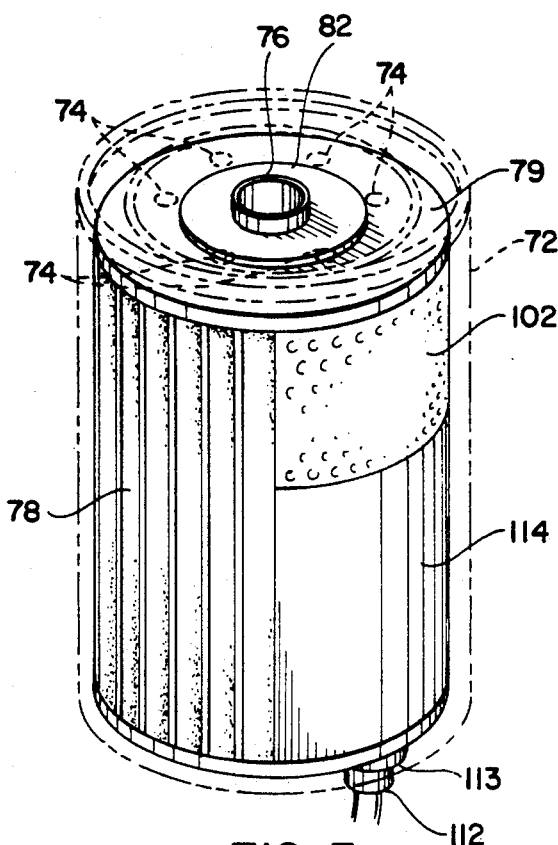
FIG. 3 is a perspective view of a modified form of the filter assembly as embodied in the subject invention.
Figure 4:
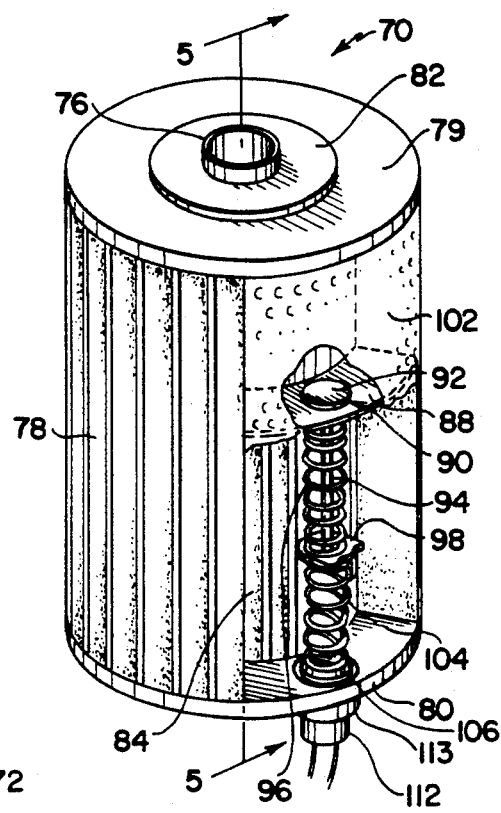
FIG. 4 is a view similar to FIG. 3 and illustrates the location of the primary and secondary filters in the modified form of the invention.
Figure 5:
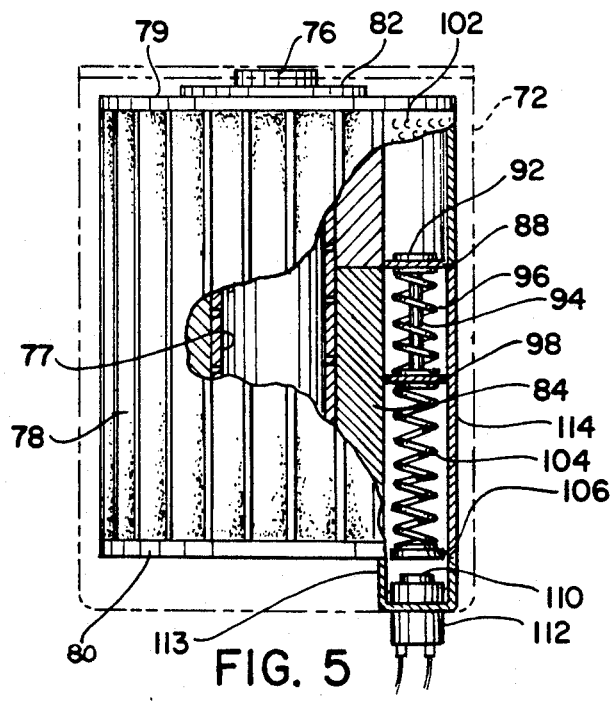
FIG. 5 is a sectional view taken along line 3—3 in FIG. 4.

Referring now to FIGS. 3–5, a modified form of the invention is illustrated and as shown the filter assembly, which is generally indicated at 70, is of the cartridge type normally associated with the filtering of oil in internal combustion engines. However, it is understood that the filter assembly 70 is also applicable for use in fuel filtering systems and in other systems where the filtering of a fluid medium is required.

The filter assembly 70 includes a cylindrical housing 72 indicated in phantom in FIG. 3, a plurality of openings 74 being formed in the upper wall of the housing 72 for entry of oil or the fluid to be filtered therethrough. A discharge or outlet member 76 is disposed coaxially of the housing 72 on the upper wall thereof and directs fluid as filtered by the filter assembly 70 to an external source for recirculation as required. As will be described hereinafter, the fluid to be filtered enters through the inlet openings 74, flowing through a filter element 78 and then into an internal passage 77 that defines an outlet chamber for discharge through the outlet member 76, to which an outlet conduit is joined.

Referring now to FIGS. 4 and 5, the internal construction of the filter assembly 70 is illustrated and as shown includes the filter element 78 that may be formed of any suitable material but having a corrugated conformation as is well known in oil filters of the type illustrated. An upper plate 79 and a lower plate 80 are fixed to the filter element 78, the upper plate 79 having the outlet member 76 secured thereto. The filter element 78 is generally cylindrical in configuration and is received in the cylindrical housing 72 of the filter assembly 70, the space between the interior wall of the housing 72 and the filter element 78 defining an inlet chamber. In the form of the invention as illustrated in FIGS. 4 and 5, the filter element 78 defines the primary filter element through which the fluid to be filtered is normally directed for the filtering thereof. In order to provide for a secondary filter for the purpose of the subject invention as described, a portion of the filter element 78 is cut-away as is more clearly shown in FIG. 4, the cut-away portion receiving a secondary filter 84 therein. The secondary filter 84 is located adjacent to the internal passage 77, the walls of which are formed with openings through which the fluid flows. The secondary filter 84 has an arcuate configuration, the radius of curvature of which is generally concentric with the primary filter 78 and the internal passage 77. As shown in FIG. 4, the secondary filter 84 is located in the cut-out portion of the primary filter 78, and is positioned between the circular bottom plate 80 and an upper movable plate 88 that also has an arcuate configuration. Interconnected to the movable plate 88 is a by-pass valve generally indicated at 90 that includes a valve head 92 and a valve stem 94. A compression spring 96 encircles the valve stem 94 and is located between the plate 88 and a fixed bracket 98 that is conveniently secured to a wall of the filter element 78. Thus, upon movement of the by-pass valve 90 in response to an increase in pressure in the inlet chamber, the spring 96 is compressed and the plate 88 is moved therewith. As shown in FIG. 5, the secondary filter 84 is disposed between the normal position of the plate 88 and the bottom plate 80. Thus, as the plate 88 is moved downwardly with the valve head 90 and valve stem 94 as a result of obstruction of the primary filter 78, the fluid that normally is contained in the space above the by-pass valve 90 flows into the secondary filter 84 for the filtering thereof, and then flows into the interior discharge passage 77 for discharge through the discharge member 76 and the conduit connected thereto. The space above the movable plate 88 also forms a part of the inlet chamber and normally receives fluid therein. Thus, when the plate 88 is moved downwardly as a result of obstruction of the primary filter 78, the fluid readily flows by the by-pass valve 90 and into the secondary filter 84.

A third filter is also provided in the form of the invention as illustrated in FIGS. 3–5, and is shown as a curved filter plate 102 that may be formed of stainless steel or other filter medium, having a plurality of openings formed therein. The filter 102 acts to remove the coarse particles from the fluid as it enters the space above the plate 88. As also shown in FIG. 3, a curved cover plate 114 is fixed to the adjacent edges of the filter element 78 and securely encloses the secondary filter and by-pass valve and confines the normal flow of the fluid medium within the housing 72.

It is also contemplated to provide an alarm device for signalling the obstruction of the primary filter 78, and for this purpose a compression spring 104 that is weaker than the spring 96 is disposed below the plate 98 and is interconnected to a lower disc 106. A switch contact 110 is mounted in a switch housing 112 that extends into an extension 113 of the plate 80 and that is disposed beneath the lower disc 106, the switch housing 112 extending through the housing 72 in sealed relation. The switch 110 is actuated by the engagement of the lower disc 106 with the contact 110 upon movement of the by-pass valve 90 in response to an obstruction of the primary filter 78, the switch contact 110 being electrically connected to an alarm circuit which operates to audibly or visually signal the presence of the defective primary filter.

In use of the device as illustrated in FIGS. 3–5, flow of the fluid to be filtered is normally directed into the filter assembly through the inlet openings 74 and interiorly of the housing 72 into the inlet chamber. The fluid then enters the primary filter 78 and passes therethrough into the interior axial outlet chamber 77 for discharge through the outlet element 76 for recirculation through an outlet conduit. When the primary filter 78 becomes obstructed, the fluid which normally enters the inlet area above the by-pass valve 90 is subject to an increased pressure, and the spring 96 is then compressed to cause the by-pass valve 90 to open. As the valve head 92 urges the plate 88 downwardly as illustrated in FIG. 5, the fluid enters the secondary filter 84 and then into the interior axial discharge chamber 77. Fluid is also filtered as it enters into the area above the by-pass valve by the third filter 102, and the movement of the by-pass valve 90 triggers the downward movement of the lower disc 106 for contacting the switch contact 110 thereby closing the circuit to the audible and visual alarms.

In the form of the invention as illustrated in FIGS. 3–5, since the primary, secondary and tertiary filters are all formed as an integral unit, the obstruction of the primary filter 78 will result in a complete replacement of the entire filter assembly including the primary, secondary, and tertiary filters. However, the operation of the device, which results in flow of the fluid through the secondary filter 84 when the primary filter is obstructed, will prevent a back-up of the fluid through the primary filter and will enable the fluid to continuously flow through the filter assembly before the replacement thereof.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A filter assembly for filtering a fluid as received from a source, comprising a cylindrical housing having an inlet chamber and an outlet chamber located in said housing in coaxial relationship therewith, means for separating said inlet chamber from said outlet chamber, a fluid inlet located between the source of said fluid and said inlet chamber for directing said fluid to be filtered therein, a cylindrical primary filter positioned in said inlet chamber, the longitudinal axis of said primary filter being offset in parallel relation with respect to the longitudinal axis of said chamber, said primary filter including a filter material for receiving the fluid for filtering unwanted deposits therefrom, said outlet chamber being located in said housing adjacent to said primary filter, said means for separating including means for directing the filtered fluid from said primary filter to said outlet chamber, a fluid outlet located in said outlet chamber for directing the filtered fluid exteriorly of said housing, and a cylindrical secondary filter located in said housing within said outlet chamber, the longitudinal axis of said secondary filter being disposed in parallel offset relation with respect to the longitudinal axis of said primary filter, said means for separating including a by-pass port for directing fluid from said inlet chamber to said secondary filter, a by-pass valve for controlling the flow of fluid through said by-pass port from said inlet chamber into said secondary filter, said by-pass valve being exposed to the pressure in said inlet chamber and being responsive to a predetermined increase of pressure in said inlet chamber as a result of obstruction of the fluid path through said primary filter, wherein said by-pass valve is movable to an open position upon said predetermined increase in pressure, wherein the fluid to be filtered enters into said secondary filter for the filtering thereof when said bypass valve is in said open position and the filtered fluid is directed through said secondary filter and into said outlet chamber for the discharge thereof through said fluid outlet, and a by-pass filter located in said inlet chamber adjacent to said by-pass port and by-pass valve therefor for filtering coarse particles from the fluid medium prior to the fluid medium flowing through said by-pass port and by said by-pass valve into said secondary filter.

2. A filter assembly as claimed in claim 1, an alarm switch located in said secondary filter and electrically communicating with an alarm circuit, said alarm switch being responsive to movement of said by-pass valve to said open position for actuating said alarm circuit to indicate a clogged primary filter condition.

3. A filter assembly as claimed in claim 2, a first compression spring being located in said secondary filter for biasing said bypass valve towards a closed position, a second compression spring being located in said secondary filter in axial alignment with said first compression spring and being movable with said by-pass valve, said second compression spring being compressed upon movement of said first compression spring and said by-pass valve in said open position to engage said alarm switch for actuating said alarm circuit.

4. A filter assembly as claimed in claim 1, a cap being mounted on said housing adjacent to said inlet chamber and being removable from engagement with said housing to provide access to the interior of said housing for removing the primary and secondary filters for the replacement thereof.

5. A filter assembly as claimed in claim 1, wherein said means for separating is comprised of an intermediate wall formed in said housing and separating said inlet and outlet chamber, said directing means including a primary port formed in said intermediate wall and being located between said primary filter and said outlet chamber, said by-pass port being formed in said wall and being normally closed by said by-pass valve.

* * * * *